Aug. 17, 1937. C. J. DEXTER Re. 20,470
ROLL ROOFING FASTENER
Original Filed Sept. 8, 1932
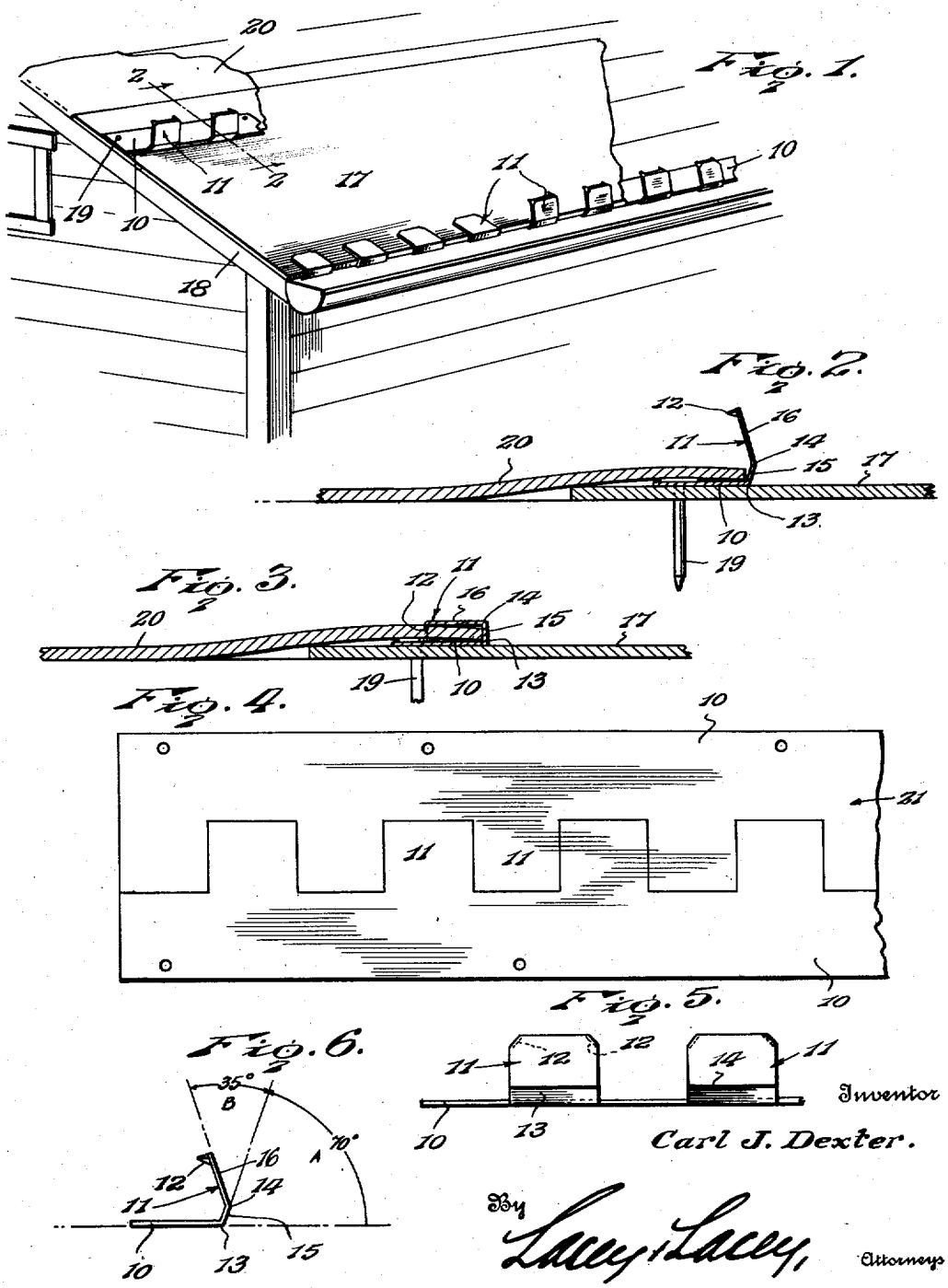
Inventor
Carl J. Dexter.
By Lacey & Lacey, Attorneys Reissued Aug. 17, 1937 Re. 20,470

UNITED STATES PATENT OFFICE 20,470

ROLL ROOFING FASTENER

Carl J. Dexter, La Fayette, Ind.

Original No. 1,990,776, dated February 12, 1935, Serial No. 632,245, September 8, 1932. Application for reissue February 11, 1937, Serial No. 125,286

11 Claims. (Cl. 108—33)

This invention relates to fasteners for securing the edges of roll roofing, and has for an object to provide an inexpensive and efficient device of this character which will facilitate the handling of roll roofing such as composite strips of asphaltum and felt, while laying the same.

A further object is to provide a sheet metal fastening device having clasps pre-bent at definite angles to embrace the lower edge of the roll roofing and exert strong continuous pressure on the lapped edge to provide a water-tight and a practically air-tight joint when hammered closed.

A further object is to provide a fastening device in which a strip of rust-resisting metal is disposed between the lapped edges of adjoining rolls of roofing to hold the roofing nails in such a manner that no nails are exposed and no nail holes are formed in the surface through which water can seep.

A further object is to provide a fastening device so constructed that the blanking out of strips before they are bent into usable shape is done without the loss of any metal since the devices interlace with one another as cut from the flat sheet.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawing forming part of this specification,

Figure 1 is a perspective view of my improved roll roofing fastening device in operative position, Figure 2 is a cross section taken on the line 2—2 of Figure 1, showing one of the clasps of the fastener in initial position, Figure 3 is a view similar to Figure 2 but showing the clasps driven home to final position, Figure 4 is a plan view of the blank from which the fasteners are struck, Figure 5 is a detail view showing the strip with a pair of the clasps in front elevation, and Figure 6 is a detail view showing the strip with one of the clasps in end elevation.

One of the most inexpensive types of modern roofing consists of wide strips, usually 36", of composition roofing made up largely of asphaltum and felt. Such strips are laid vertically or horizontally on the roof with one piece, the upper, lapping over the other. The joint thus formed is sealed and greatly strengthened by the use of a thick asphalt paint, which after hardening and drying, produces a bond often practically as strong as the roofing material itself. This joint is held to the roof by the use of roofing nails which are placed at close intervals across the roof.

A very common and unfortunate condition found to exist in such joints is that numerous leaks occur, due to various causes such as, for instance, the holes formed by the roofing nails becoming enlarged in time, and often the nails themselves become loosened, and in severe cases, strips of roofing are blown from the roof.

The enlargement of the nail holes is probably due to several causes. The pulling of the roofing in contracting and expanding due to temperature changes is no doubt one cause. It is known also that because the heads of the nails are exposed to the sun, the heat draws the nails and causes them to be loosened with resultant leaks. Irrespective of the cause, it is true that many such nails often lose their holding power and may be readily lifted from position. The changing condition of wood due to varying temperature and moisture over a period of years also affects the holding power of the nails. The most common cause of leaks, therefore, is probably due to the fact that a large number of nails, driven into the underlying sheathing, strike knots, cracks, holes, or soft places in the wood and, of course, in such condition, soon become loosened and subsequently induce leaks.

My present invention provides a device whereby the above outlined objectionable conditions may be economically and effectively corrected.

The fastener comprising the subject matter of the present invention consists of a strip 10 of rust-proof sheet metal (No. 26 gauge, 30" long has proved to be very satisfactory) so formed as to provide a continuous nailing piece from the lower edge of which projects a series of tongues or clasps 11 which, when bent down into proper position, hold the included edge of the overlapping roofing rigidly in place. The upper two corners of each clasp are bent at right angles to the plane of the clasp, and are bent on the bias across the corners, as shown in Figure 5, to form a pair of teeth 12 or piercing ends adapted to be embedded in the roofing surface (meaning that they pierce and extend to some extent below the roofing surface) when the clasps are bent down to final position. These teeth are too short, about .070" long, to pass entirely through the overlapping layer of roofing but long enough to pass well down through the surface.

Each clasp 11 is sharply bent at precise angles to cause the clasp to come down on the roofing in a predetermined position, as best shown in Figures 2 and 6. Each clasp is provided with spaced sharp bends 13 and 14. The initial bend 13 is formed at the juncture of the clasp with the base strip or lower leg and disposes the base portion 15 or upstanding shoulder of the clasp at a predetermined angle to the plane of the strip 10 continued, preferably 70°. The next bend 14 is disposed at a distance from the first bend slightly greater than the normal thickness of the roofing material and disposes the terminal free portion 16 or upper leg of the clasp at a greater angle to the plane of the strip continued, than the base portion of the clasp, preferably 35°.

Roll roofing is sometimes laid vertically on the roof but the horizontal method is shown in Figure 1, as this plan is better suited to the use of my improved fasteners. The work of roofing begins with the laying of one piece 17 horizontally across the lower part of the roof 18 and this piece may initially be held in position by a few nails across the upper edge. Another method is to attach the strip 10 of the fastener to the lower edge of the roof and then allow the strip of roofing material to settle down against the upright clasps 11. Irrespective of the method of placing the initial strip of roofing in position, the fasteners are next placed in continuous position across the upper part of the piece 17 and set down far enough to provide a lap joint of 1½ to 2 inches. The strips are then nailed in position as indicated at 19. Next the succeeding piece 20 of roofing, including the flat strips of the fasteners over which said sheet of roofing will lie, is heavily coated with roofing cement as is customary for such lap joints.

The second piece 20 of roofing to be laid is now slipped down against the upright clasps 11, see Figure 2, and the clasps are then firmly bent down, by the use of a hammer, to the position shown in Figure 3, to grip and permanently hold the overlapping piece of roofing in place. Ends or roofing pieces that do not pass entirely across the roof may be fastened in like manner.

In addition to holding the roof rigidly in place the use of these fasteners affords a great added convenience in handling the roofing material. Roll roofing sometimes is quite heavy, as much as 90 pounds per roll, and particularly on a steep roof, great difficulty is experienced in holding a long strip of roofing in proper position until it is nailed and finally fastened. By the use of my improved fasteners, the roofing is unrolled and allowed to settle down in accurate location as determined by the previously nailed fastening strips. This not only greatly improves the accuracy of the work but also brings about a considerable saving in labor.

The essential advantage of my improved fastener is that the nail heads are completely covered by the overlapping roofing and thus, even if some nails are loose, leaks cannot result. Furthermore, the nail holes through the lower layer or roofing are placed above and out of line with the teeth to prevent any possible leak in case the roofing is defective or holes should develop at the points of contact of the teeth. The essential value and effectiveness of the fastener depends upon the form of the clasps imparted during manufacture and before the clasp is bent down into final position.

The dual purpose of the clasps is to grip the roofing rigidly both by contact with the surface and by the slightly embedded teeth. As above stated the sheet metal clasp is sharply bent at precise angles to cause the clasp to engage the roofing in a predetermined position. It is found in practice that the proper angles to produce the best results are as follows. Angle A, Figure 6, is approximately 70° and that of B about 35°, making in all, for the erected clasp, something more than a right angle. The angular bends at 13 and 14 are sharply made to induce bending at these points. The integral base portion 15 of the clasp is necessarily made somewhat wider than the roofing is thick .145'' being the most preferred dimension since most roofing is .130'' thick or less. Thus when the clasp is bent down by hammer, the toothed end strikes the roofing surface first and attaches itself under heavy continuous pressure. This holds the underlying roofing firmly in place and the joint, in due time, is further strengthened by the hardening of the roofing cement.

It will be seen that no nails are exposed and no nail holes are formed in the roofing surface through which water can seep. The continuous strong pressure of the series of clasps makes not only a water-tight but also a practically air-tight joint. Preferably galvanized sheet metal is used that will not break or rust at the points of bending.

By referring now to Figure 4 it will be seen that the blanking out of the fasteners before they are bent into usable shape, is done without the loss of any metal since the clasps 11 interlace with one another as cut from the flat sheet 21.

It is known that fasteners somewhat similar in construction have hitherto been used, see Schuller Patent No. 811,445 but without the preformed bends 13 and 14. Such ordinary unbent clasps tend to bend only at the intersection with the base strip, that is, at the edge of the roofing, so that a spring action results and prevents the free end of the clasp from coming flat down on the surface of the roofing. The sharp bends of the present invention eliminate this spring action tending to space the anchoring prongs from the base, otherwise known as subsequent separation of the anchorage from the roofing. Consequently instead of a tension or pressure at the extreme end of the clasp as exhibited by present invention the old and well known devices, by virtue of said spring action, tend to become unfastened and disengaged from the surface of the roofing so that the roofing is free to slip from underneath the clasp. The present structure, on the contrary, remains anchored to the roofing material after application or mounting. The very nature of asphaltum is such that sharp teeth of the old devices, have no holding power unless passed entirely through and clinched beneath the roofing, which would produce holes in the roofing, the very thing that the present device aims to prevent. The short teeth used in my device are held firmly on the surface of the roofing under great pressure induced by the straight flat end portions of the clasps when hammered to the final position, shown in Figure 3. The diagonal positioning in opposed relation of the teeth 12 of each clasp insures permanent positioning of the roofing material engaged thereby, because said teeth oppose shifting movement of the material in any direction in the plane of said material.

The essential principle of my invention, and the feature for which patent protection is merited and desired, is the shape of the fasteners so preformed as to bend definitely at predetermined points to grip the roofing firmly and in a non-injurious manner, thus affording a strong, inexpensive method of fastening that is proof against leaks.

What is claimed is:

1. A fastener for flexible composition roofing comprising an elongated strip, a plurality of tongues formed integral with said strip and projecting in spaced relation to each other from one of the longitudinal edges thereof, each tongue bent on preformed lines parallel to each other and parallel with the adjacent edge of said strip to provide a clasp portion, that portion of the tongue between the bends comprising a base portion disposed at an obtuse angle to the plane of the strip, the free end of said tongue inclined from its line of bend so as to overlie the strip, and prongs bent from the free corners of said tongue at angles to each other and in the direction of said strip.

2. A clip for fastening overlaying roofing material and made of a single strip of non-rusting metal of sufficient flexibility to bend easily, said strip comprising a lower leg, an upstanding shoulder of a height greater than the normal thickness of the roofing material to be fastened, an upper leg bent in an upwardly slanting direction, said upper leg terminating in a downturned piercing end substantially straight so it can be driven into the roofing material, and adapted to enter only the outer roofing material when said upper leg is struck by a hammer.

3. A clip for fastening overlaying roofing material and made of a single strip of non-rusting metal of sufficient flexibility to bend easily, said strip comprising a lower leg, an upstanding shoulder of a height greater than the normal thickness of the roofing material to be fastened, an upper leg bent in an upwardly slanting direction, said upper leg terminating in a downturned piercing end substantially straight so it can be driven into the roofing material, and of a length less than the normal thickness of the roofing material whereby same will not extend through said roofing material when the upper leg is bent down on the outer face of the roofing material.

4. In combination with roofing material, a fastener having a base portion, a projecting portion adapted to enclose the edge of the roofing sheet, said projecting portion being bent on parallel lines adjacent to and parallel with the edge of the roofing sheet, the distance between the bends of the projecting portions being greater than the thickness of the roofing sheet, and prong means on the projecting portion adapted to be embedded in the outer face of the roofing material and being of less length than the normal thickness of said roofing material.

5. In combination with sheet roofing material, a strip provided beneath an edge of the material, a tongue integral with and projecting laterally from said strip and enclosing the edge of the material, said tongue bent on parallel lines adjacent to and parallel with the edge of the roofing material, the distance between the bends of said tongue being greater than the thickness of said material, and prong means on said tongue embedded in the outer face of the roofing material.

6. A fastener for flexible composition roofing comprising an elongated strip, a plurality of tongues formed integral with said strip and projecting in spaced relation to each other from one of the longitudinal edges thereof, each tongue bent on preformed lines parallel to each other and parallel with the adjacent edge of said strip to provide a clasp portion, that portion of the tongue between the bends comprising a base portion disposed at an obtuse angle to the plane of the strip, the free end of said tongue inclined from its line of bend so as to overlie the strip, and prong means of less thickness than the base portion between the bends bent from said tongue in the direction of said strip.

7. A fastener of the structure set forth in claim 6 having the prong means disposed at different angles.

8. In combination with flexible roofing material a metal strip beneath an edge of the material, a tongue integral with and projecting laterally from said strip and enclosing the edge of the material, said tongue bent on parallel lines adjacent to and parallel with the edge of the roofing material, the distance between the bends of said tongue being greater than the thickness of said material, and prong means on said tongue embedded in the outer face of the roofing material.

9. A clip for fastening overlaying flexible roofing material comprising a single strip of metal having a lower leg, an upstanding shoulder of a height greater than the normal thickness of the roofing material to be fastened, an upper leg slanting upwardly, and a substantially straight piercing prong extending downwardly from the upper leg so it may be driven into the roofing material and adapted to enter only the outer roofing material when said upper leg is struck by a hammer.

10. A clip for fastening overlaying flexible roofing material and made of a single strip of metal of sufficient flexibility to bend easily, said strip consisting of a lower leg, an upstanding shoulder of a height greater than the normal thickness of the roofing material to be fastened, an upper leg bent in an upwardly slanting direction, said upper leg terminating in a downturned piercing end substantially straight so it can be driven into the roofing material, and adapted to enter only the outer roofing material when said upper leg is struck by a hammer.

11. In combination with flexible sheet material a non-rusting metal fastener consisting of a strip beneath one edge of the material, a tongue integral with and projecting laterally from said strip and enclosing the edge of the material, said tongue bent on parallel lines adjacent to and parallel with the edge of the roofing material, the distance between the bends of said tongue being greater than the thickness of said material, and prong means at the free end of said tongue embedded in the outer face of the roofing material.

CARL J. DEXTER.